Nov. 25, 1930.  E. R. WEAVER  1,782,524
RUDDER AND BRAKE CONTROL
Filed May 21, 1929
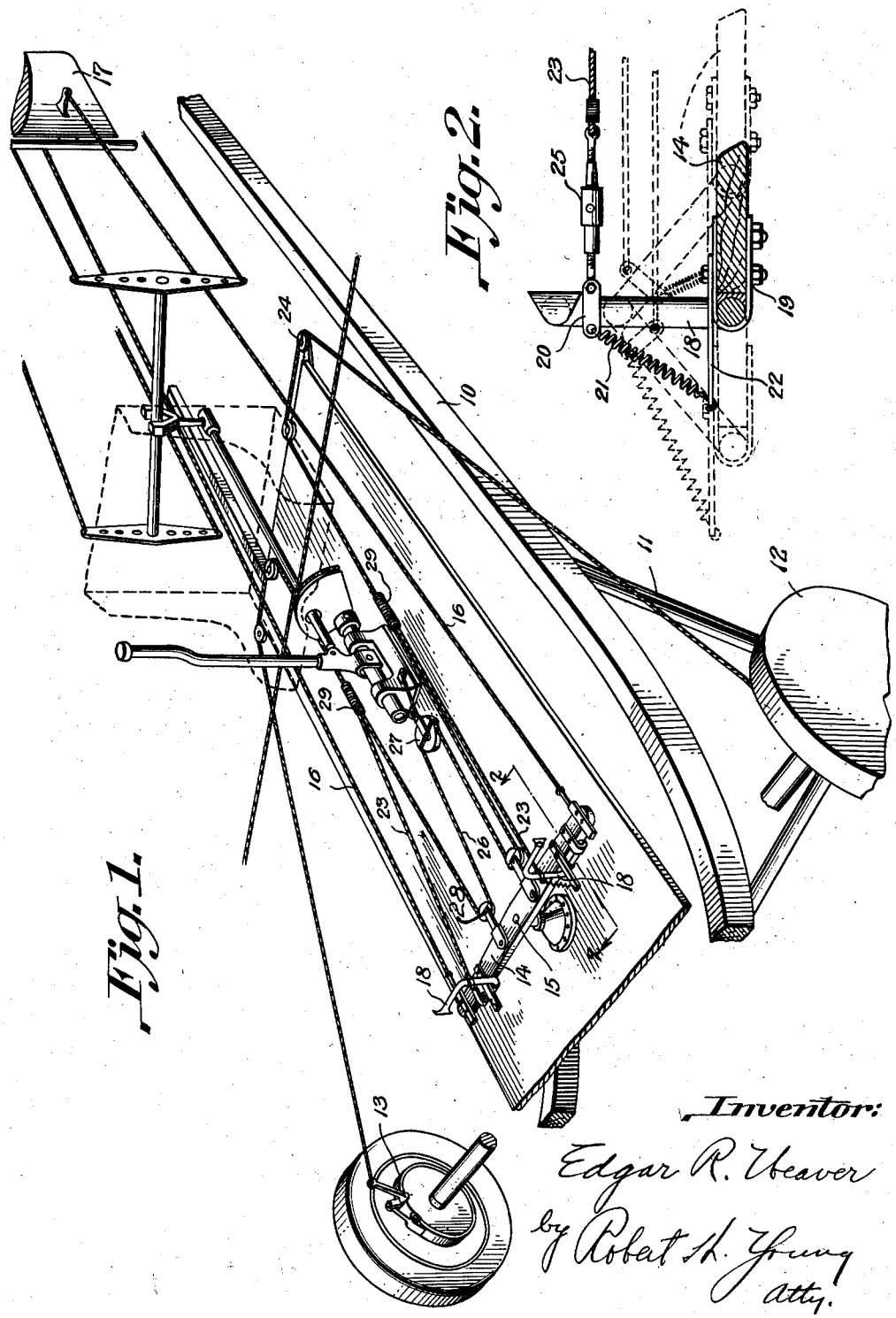
Inventor:
Edgar R. Weaver
by Robert H. Young
Atty.

Patented Nov. 25, 1930

1,782,524

UNITED STATES PATENT OFFICE

EDGAR R. WEAVER, OF DAYTON, OHIO

RUDDER AND BRAKE CONTROL

Application filed May 21, 1929. Serial No. 364,867.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to aircraft and more particularly to brake operating means therefor.

The object of this invention contemplates the provision of a combined rudder control and landing wheel brake operating means in which the control of the rudder and the operation of the brakes can be either simultaneously or separately accomplished.

Further it is the object of this invention to provide a landing wheel brake control means as above set out that is capable of applying the brakes on the landing wheels either separately or collectively.

More specifically this invention consists in a rudder and landing wheel brake control that has connecting cables from the wheel brakes to tilting pedals on the rudder bar making it possible to apply the brakes either simultaneously or separately.

In the drawings wherein like reference characters represent like parts in the several views:—

Fig. 1 is a perspective diagrammatic view of the rudder and brake control.

Fig. 2 is a section taken on line 2—2 Fig. 1.

Referring to the parts by reference numerals 10 designates the longérons, 11 the landing gear struts and 12 the landing wheels of the conventional type of aircraft. The wheels have brakes 13 of any desired type. A rudder bar 14 is pivoted at 15 in the usual manner in leg reach of the pilot and has connected to the ends thereof rudder control cables 16 that have their opposite ends fast to the rudder 17. The rudder 17 is therefor moved in the usual manner for directional control of the aircraft.

A pair of tiltable foot operated brake pedals 18 are carried by the rudder bar 14 by means of the retaining straps 19. Each pedal 18 has a collar 20 about its upright portion and a spring 21 connected to the forward side thereof, the said springs 21 having their other ends fast to a bracket 22 carried by the rudder bar 14. The springs exert a pull on one side of the pedals 18 to resiliently retain the same in a neutral position. Brake operating cables 23 are connected at one end to the wheel brakes 13 and are trained over sheaves 24 and have their other ends secured to the collars 20 on the brake pedals 18. If so desired a tension adjusting means 25 as illustrated in Fig. 2 can be interposed in the brake operating cables 23.

A compensating equalizing means is provided to alow for the movement of the rudder bar 14 about its pivot 15 without applying the brakes although the rudder bar will obviously carry the brake pedals in its movement about its pivot. This means consists of a compensating cable 26 trained over a fixed sheathed pulley 27 and a pair of movable sheathed pulleys 28 carried by the rudder bar 14 on either side of the pivot 15. The ends of the compensating cable 26 are made fast to the brake operating cables 23 at 29.

The rudder 17 may be adjusted for directional control of the aircraft as the rudder bar 14 is moved about its pivot 15 in the usual manner. The pedals 18 may be tilted forward on the rudder bar to apply the brakes irrespective of the position of the rudder bar. By this movement these pedals pull the brake cables 23 about the sheaves 24, placing the brakes under tension. It is obvious from the foregoing description and by reference to the drawings that the pedals 18 may be tilted either separately or simultaneously by the feet of the pilot whereby the brakes 13 are applied on either one wheel or both wheels of the airplane.

As the rudder bar 14 is moved about its pivot 15 one of the pulleys 28 is moved forward and the other rearward and the brake pedals 18 travel likewise, however, no movement is imparted to the brake cable 23 by this movement as the compensating cable 26 moves over the pulleys 27 and 28 and the foot engaging portion of the pedals 18 remains in a neutral position. This is illustrated to advantage in Fig. 2.

I claim:

1. An aircraft having a rudder and landing wheel brakes, a pivoted rudder control bar, cables connecting said bar and said rudder, tiltable brake operating pedals on said bar, brake cables connecting said pedals and said brakes and means to retain said pedals in a neutral position when said bar is moved about its pivot, said means comprising a compensating cable trained over a fixed pulley and over a pair of pulleys on said rudder bar on either side of the pivot thereof and having its ends fast to said brake operating cables.

2. Controlling means for an aircraft comprising a steering device and landing wheel brake mechanism interconnected therewith, including wheel brakes, brake actuating means mounted on said steering device and means interconnecting said steering device and said brake actuating means to effect a relative displacement of said steering device and brake actuating means when said steering device is actuated and also to permit a relative movement of said steering device and brake actuating means at will whereby said brake actuating means is operable independently of said steering device.

3. Controlling means for an aircraft comprising a steering device and landing wheel brake mechanism interconnected therewith, said brake mechanism including brake pedals movably mounted relative to said steering device and equalizing means cooperating with said steering device and said brake pedals for maintaining said pedals substantially in a fixed plane when said steering device is operated relative thereto and to permit independent operation of said brake mechanism in any position of said steering device.

4. Control mechanism for an aeroplane comprising in combination a rudder, brakes, control device comprising a centrally pivoted rudder bar having brake pedals mounted on opposite ends of said bar engageable by the pilot's feet, connections to the rudder operated by one type of movement of the rudder bar for independent operation of said rudder, connections to the brakes operated by a different type of movement of the pedals for operation of said brakes independent of said rudder, and equalizing means operatively connected with said rudder and brake connections to effect equal and opposite relative movements of said pedals and rudder bar upon movement of said rudder bar.

5. Control mechanism for an aeroplane comprising in combination a rudder, brakes, control device including a centrally pivoted rudder bar and a brake pedal mounted on each end of said rudder bar, connections to the rudder bar operated by one type of movement of the control devices for independent operation of said rudder, connections to the brakes operated by a different type of movement of the control devices for operation of said brakes independent of said rudder, and equalizing means including pulleys mounted on opposite sides of the center of the centrally pivoted bar operatively connected with said rudder bar and brake pedals to effect equal and opposite relative movements of said pedals and rudder bar upon movement of said rudder bar.

6. An aircraft having a bar centrally pivoted and arranged for movement to control the rudder, brake operating members mounted on opposite ends of said bar and means cooperating with said bar and operating members for effecting a relative movement of said bar and operating members when said bar is actuated.

7. Control mechanism for an airplane as claimed in claim 5, in which the equalizing means include pulleys mounted on opposite sides of the center of the centrally pivoted bar, a pulley fixed against relative movement with respect to the first mentioned pulleys, and a cable passing around each of said pulleys and having its ends connected to said pedals.

8. An aircraft having a bar centrally pivoted and arranged for movement to control the bar, brake operating members pivotally mounted on opposite ends of said bar and means cooperating with said bar and operating members for angularly moving said members in opposite directions when said bar is actuated.

9. An aircraft having a bar centrally pivoted and arranged for movement to control the rudder, brake operating members mounted on opposite ends of said bar and equalizing means cooperating with said bar and operating members for relatively moving said bar on said operating members to maintain said operating members substantially in a fixed plane for every position of said bar.

In testimony whereof I affix my signature.

EDGAR R. WEAVER.